United States Patent
Hallquist et al.

(10) Patent No.: US 9,098,229 B2
(45) Date of Patent: Aug. 4, 2015

(54) SINGLE IMAGE POSE ESTIMATION OF IMAGE CAPTURE DEVICES

(71) Applicants: Aaron Hallquist, Hiawatha, IA (US); Avideh Zakhor, Berkeley, CA (US)

(72) Inventors: Aaron Hallquist, Hiawatha, IA (US); Avideh Zakhor, Berkeley, CA (US)

(*) Notice: Subject to any disclaimer, the term of this patent is extended or adjusted under 35 U.S.C. 154(b) by 0 days.

(21) Appl. No.: 13/888,156

(22) Filed: May 6, 2013

(65) Prior Publication Data

US 2014/0212027 A1    Jul. 31, 2014

Related U.S. Application Data

(60) Provisional application No. 61/643,108, filed on May 4, 2012.

(51) Int. Cl.
G06K 9/00    (2006.01)
G06F 3/14    (2006.01)

(52) U.S. Cl.
CPC .................................. G06F 3/1415 (2013.01)

(58) Field of Classification Search
None
See application file for complete search history.

(56) References Cited

U.S. PATENT DOCUMENTS

| | | | |
|---|---|---|---|
| 2008/0144925 A1* | 6/2008 | Zhu et al. | 382/154 |
| 2010/0045701 A1* | 2/2010 | Scott et al. | 345/633 |
| 2010/0103196 A1* | 4/2010 | Kumar et al. | 345/633 |
| 2010/0191459 A1* | 7/2010 | Carter et al. | 701/208 |
| 2014/0233847 A1* | 8/2014 | Ratcliff et al. | 382/154 |

OTHER PUBLICATIONS

Belimpasakis, Petros, Petri Selonen, and Yu You. "Bringing user-generated content from internet services to mobile augmented reality clients." Virtual Reality Workshop (CMCVR), 2010 Cloud-Mobile Convergence for. IEEE, 2010.*
Zhang, Jerry, et al. "Location-based image retrieval for urban environments." Image Processing (ICIP), 2011 18th IEEE International Conference on. IEEE, 2011.*

* cited by examiner

*Primary Examiner* — Li Liu
(74) *Attorney, Agent, or Firm* — Kali Law Group, P.C.

(57) ABSTRACT

Methods for image based localization using an electronic computing device are presented, the methods including: capturing a local image with an image capture device; associating metadata with the local image; causing the electronic computing device to receive the local image; causing the electronic computing device to match the local image with a database image, where the database image is three-dimensional (3D); and calculating a pose of the image capture device based on a pose of the database image and metadata associated with the local image. In some embodiments, the metadata includes at least pitch and roll data corresponding with the image capture device at a time of image capture.

11 Claims, 4 Drawing Sheets

SINGLE IMAGE POSE ESTIMATION OF IMAGE CAPTURE DEVICES

BACKGROUND

Pose estimation of mobile devices is useful for a wide variety of applications, including augmented reality and geo-tagging. Even though most of today's cell phones are equipped with sensors such as GPS, accelerometers, and gyros, pose estimated via these is often inaccurate. This is particularly true in urban environments where tall buildings may block satellite view for GPS and distortions in Earth's magnetic field from power lines adversely affect compass readings. In addition, indoor environments whether urban or rural present similar issues with respect to GPS reception and distortions due to power lines and other structural components of a building.

In order to determine pose, most modern smart-phones are equipped with full sensor packages, including an accelerometer, gyros, GPS, and a compass. For example, an application such as YELP MONOCLE™ utilizes a phone's GPS and compass to overlay nearby entities such as shops and restaurants on the viewfinder. Unfortunately, in urban and indoor environments, tall buildings block satellite view and introduce multi-path effects, while power lines and trains add significant magnetic interference, making both GPS and compass readings error prone. Furthermore, a barometer, a source of altitude information, is extremely unreliable. Since most of today's mobile devices are equipped with camera sensors, it is conceivable to use camera imagery to compensate for the above deficiencies in recovering full position and orientation of the mobile device. As such, single image pose estimation of image capture devices is presented herein.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for image based localization using an electronic computing device are presented, the methods including: capturing a local image with an image capture device; associating metadata with the local image; causing the electronic computing device to receive the local image; causing the electronic computing device to match the local image with a database image, where the database image is three-dimensional (3D); and calculating a pose of the image capture device based on a pose of the database image and metadata associated with the local image. In some embodiments, the metadata includes at least pitch and roll data corresponding with the image capture device at a time of image capture. In some embodiments, the calculating the pose includes: extracting the pitch and roll data from the metadata; extracting yaw data from the metadata; matching features between the local image and the database image; and estimating a homography matrix to solve for translation of the image capture device with respect to the database image. In some embodiments, the matching features includes: extracting high resolution scale invariant feature transform (SIFT) features from the local image and the database image; performing a nearest neighbor search to establish any correspondence between the extracted SIFT features of the local image and the database image; excluding any corresponding database image SIFT features that lack depth data; and excluding ground plane SIFT features of the database image. In some embodiments, methods further include: if the yaw data from metadata of the local image captured is noisy, extracting a first number of vanishing points corresponding with the local image; extracting a second number of vanishing points corresponding with the database image: finding a best alignment pair between the vanishing points; calculating a corrected yaw of the image capture device; and calculating a normal direction of a vertical plane associated with each vanishing point in the local image that was matched to the vanishing point in the database image. In some embodiments, estimating the homography matrix includes: recovering a 3D translation vector, where the 3D translation vector includes direction and magnitude, between the local image and the matched database image; recovering a perpendicular distance between a center of the image capture device and the vertical plane in the local image for which the first number of vanishing points is extracted.

In other embodiments methods for image based localization using an electronic computing device are presented, the methods including: causing the electronic computing device to receive a local image captured from an image capture device; causing the electronic computing device to receive metadata associated with the local image; causing the electronic computing device to match the local image with a database image, where the database image is 3D; and calculating a pose of the image capture device based on a pose of the database image and metadata associated with the local image. In some embodiments, the metadata includes at least pitch and roll data corresponding with the image capture device at a time of image capture. In some embodiments, the calculating the pose includes: extracting the pitch and roll data from the metadata; extracting yaw data from the metadata; matching features between the local image and the database image; and estimating a homography matrix to solve for translation of the image capture device with respect to the database image. In some embodiments, the matching features includes: extracting high resolution SIFT features from the local image and the database image: performing a nearest neighbor search to establish any correspondence between the extracted SIFT features of the local image and the database image; excluding any corresponding database images SIFT features that lack depth data; and excluding ground plane SIFT features of the database image when the database image is a 3D image. In some embodiments, methods further include: if the yaw data from the metadata of the local image captured is noisy, extracting a first number of vanishing points corresponding with the local image; extracting a second number of vanishing points corresponding with the database image; finding a best alignment pair between the vanishing points; calculating a corrected yaw of the image capture device; and calculating a normal direction of a vertical plane associated with each vanishing point in the local image that was matched to the vanishing point in the database image. In some embodiments, estimating the homography matrix includes: recovering a 3D translation vector, where the 3D translation vector includes direction and magnitude between the local image and the matched database image; recovering a perpendicular distance between a center of the image capture device and the vertical plane in the local image for which the first number of vanishing points is extracted.

In other embodiments, computing device program products for image based localization using a computing device are presented, the computing device program products including: a non-transitory computer readable medium; first programmatic instructions for receiving a local image captured from an image capture device; second programmatic instructions for receiving metadata associated with the local image; third programmatic instructions for matching the local image with a database image, where the database image is 3D; and fourth programmatic instructions for calculating a pose of the image capture device based on a pose of the database image and metadata associated with the local image. In some embodiments, the metadata includes at least pitch and roll data corresponding with the image capture device at a time of image capture. In some embodiments, the fourth programmatic instructions for calculating the pose includes: fifth programmatic instructions for extracting the pitch and roll data from the metadata; sixth programmatic instructions for extracting yaw data from the metadata; seventh programmatic instructions for matching features between the local image and the database image; and eighth programmatic instructions for estimating a homography matrix to solve for translation of the image capture device with respect to the image database. In some embodiments, the matching features includes: ninth programmatic instructions for extracting high resolution SIFT features from the local image and the database image; tenth programmatic instructions for performing a nearest neighbor search to establish any correspondence between the extracted SIFT features of the local image and the database image; eleventh programmatic instructions for excluding any corresponding database image SIFT features that lack depth data; and twelfth programmatic instructions for excluding ground plane SIFT features of the database image when the database image is a 3D image. In some embodiments, computing device program products further include: if the yaw data from the metadata of the local image captured is noisy, thirteenth programmatic instructions for extracting a first number of vanishing points corresponding with the local image; fourteenth programmatic instructions for extracting a second number of vanishing points corresponding with the database image; fifteenth programmatic instructions for finding a best alignment pair between the vanishing points; sixteenth programmatic instructions for calculating a corrected yaw of the image capture device; and seventeenth programmatic instructions for calculating a normal direction of a vertical plane associated with each vanishing point in the local image that was matched to the vanishing point in the database image.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION

Notation

Figure 1:
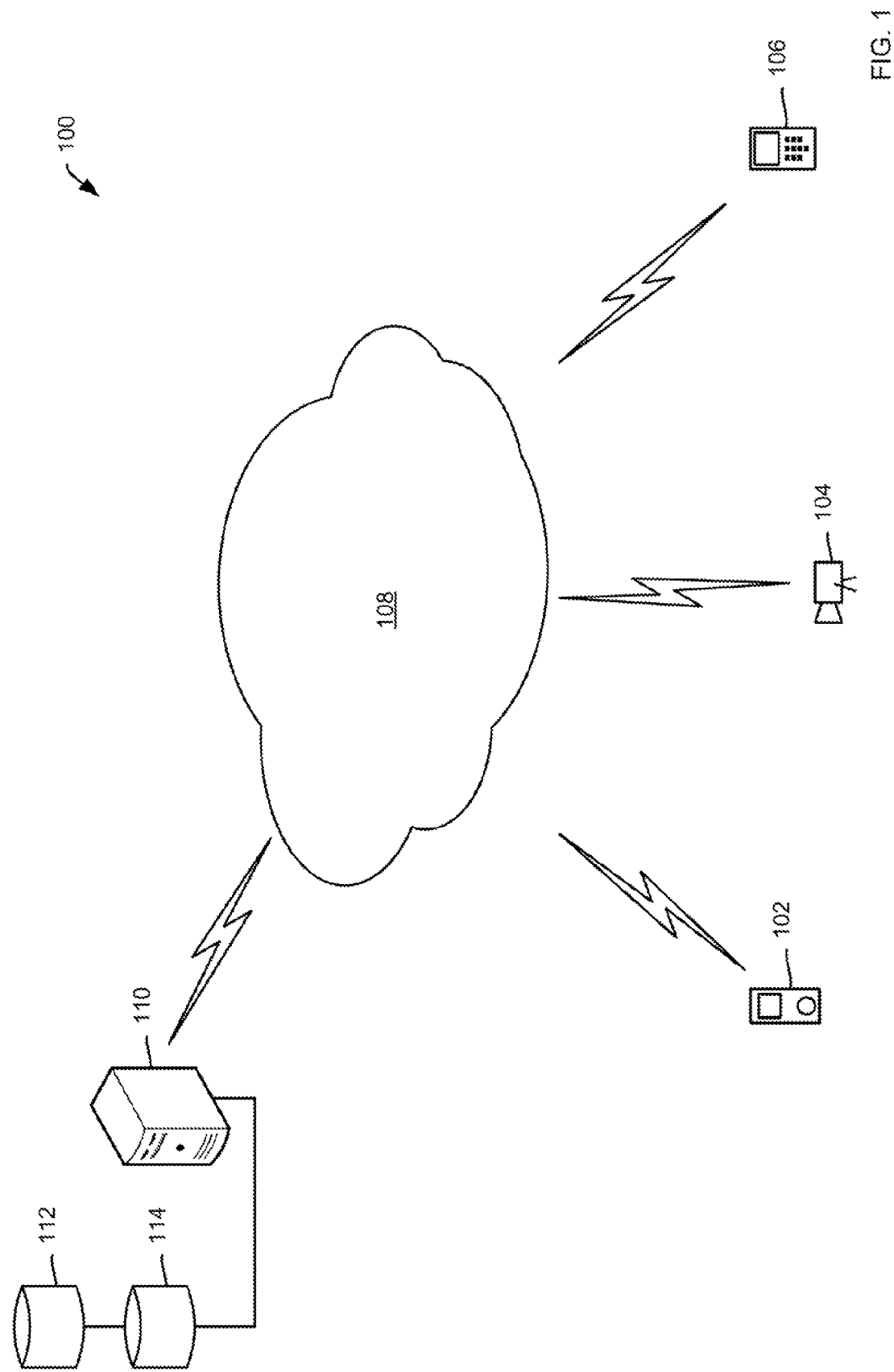
FIG. 1 is a system overview in accordance with embodiments of the present invention.

The following multiple coordinate systems and types of variables are utilized throughout this disclosure. As such, a local image taken from a image capture device is referred to as Q and its matched database image retrieved from a database as D. Furthermore, a full three-dimensional (3D) vector has a known scale and 3 independent parameters, while a 3D ray is always normalized and has an unknown scale, i.e. 2 independent parameters. In an effort to maintain clarity, the following notation is used:

Capital letters denote matrices, sets, and objects while lowercase letters denote vectors and scalars:

Hat on top to denote a normalized vector or a 3D ray, e.g. $\hat{t}$ as the direction of translation.

Vector symbol to denote a full 3D vector with scale, e.g. $\bar{t}$ to denote 3D translation.

Nothing on top of lower-case letters to denote a scalar.

For capital letters, scripts denote a set, bolds denote a matrix, normal capitals denote an object.

When coordinate frames are specified, it is done with superscripts and subscripts, as in the examples below:

$\bar{x}^d$ is a vector in the database coordinate frame.

$R_d^q$ represents the rotation matrix which maps the database image coordinate system to the local image coordinate system, e.g. $\bar{x}^q = R_d^q \bar{x}^d$.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function % act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks Referring now to the Figures, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a system overview 100 in accordance with embodiments of the present invention. As described above, methods provided herein may estimate a pose of an image capture device by retrieving a matching image from a large-scale database and combining the camera imagery with image capture device sensors. Thus, any number of image capture devices such as digital camera 102, digital camcorder 104, or mobile communication device 106 may be utilized in embodiments herein without limitation. These devices may include a wireless or wired connection to network 108. Further, these devices may include any number of sensors such as a gyroscope, an accelerometer, a compass, and a magnetometer without limitation. In some embodiments, network 108 may include the Internet, a local network, or a secure remote network without limitation. In embodiments, network 108 may include a wireless or wired connection to server 110. In turn, server 110 may include any number of image databases 112 and 114 without limitation. The illustration provided is intended to provide clarity to embodiments disclosed herein and should be not be construed as limiting.

In order to provide methods for single image pose estimation of image capture devices, at least some assumptions may be made in some embodiments. For example, methods provided may assume that a specific type of local image taken, one which (a) is mostly upright, i.e. with small roll close to zero, (b) views a scene from a reasonable distance and reasonable angles, (c) is taken at roughly human height, e.g. 1 to 3 meters above ground, and (d) stays steady for the duration of the capture. In embodiments, some of these assumptions may be utilized or ignored without limitation.

In addition database images having outdoor or indoor images may include the following information:

A dense set of image covering an indoor or outdoor environment.

The position and orientation information for each image.

A depth map for each image.

(Optional) A plane map for each image, representing a set of fit planes and their association with image pixels. Plane equations however are not known.

If panoramic images are in the database, a set of rectilinear images are extracted from each one to replace each panorama.

Rectilinear images extracted from each image are used for image retrieval and pose recovery, and their camera parameters are assumed to be known. Similarly, parameters extracted from image capture devices are assumed to be known. In addition, methods are performed in the 3D world rather than with pixel coordinates. That is, for every pixel location $(p_x, p_y)$ in an image, methods pre-multiply by the inverse of the image capture device matrix K to attain its in-world ray w, as in $$w = K^{-1}[p_x, p_y, 1]^T \qquad \text{(Equation 1)}$$

The skew parameter for K is assumed to be $\gamma=0$, and its aspect ratio is assumed to be $\alpha=1$. These conventions and assumptions about image coordinates and image capture device parameters apply to both local images and database images.

Figure 2:
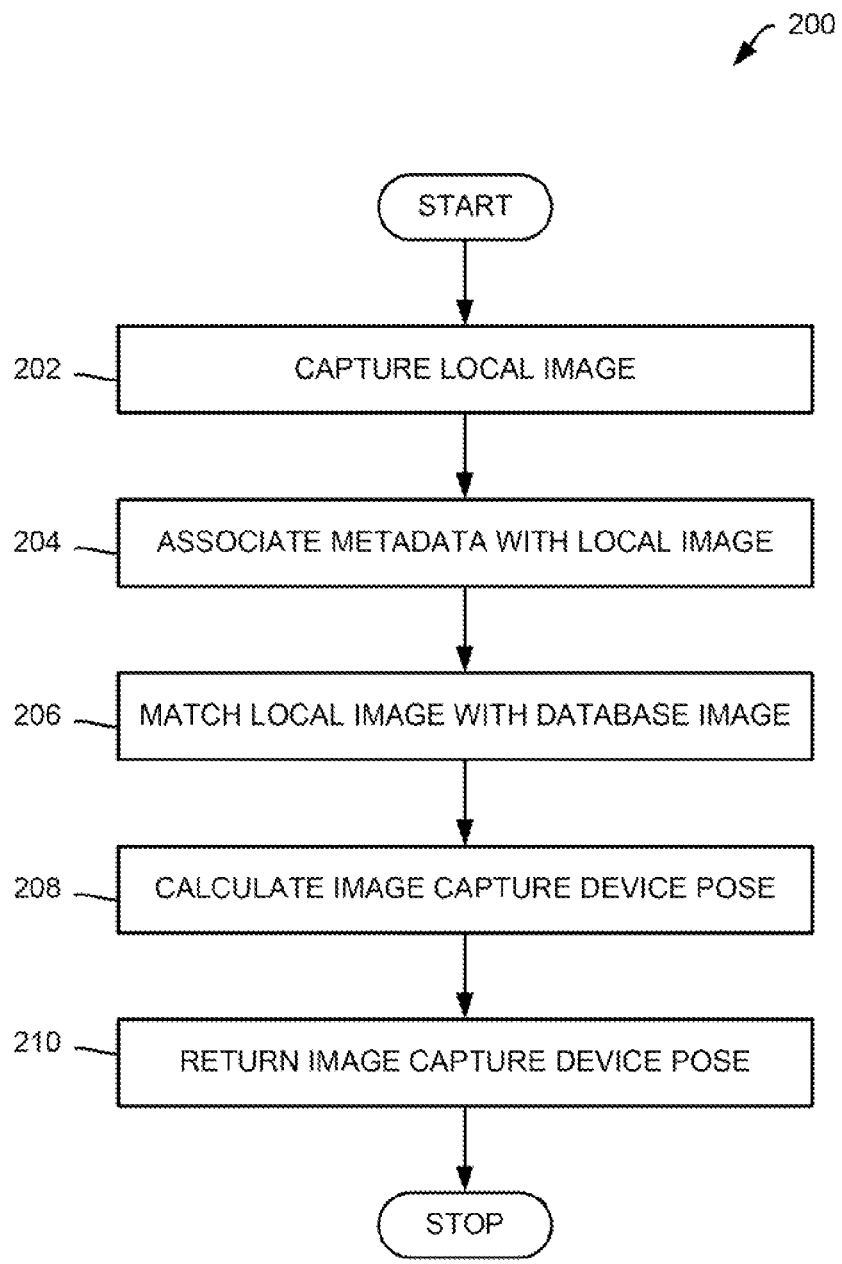
FIG. 2 is an illustrative flowchart of an overview of methods for single pose estimation of a image capture device in accordance with embodiments of the present invention.

FIG. 2 is an illustrative flowchart 200 of an overview of methods for single pose estimation of a image capture device in accordance with embodiments of the present invention. In particular, at a step 202 a local image is captured with an image capture device. As noted above, an image may be captured by any number of devices without departing from embodiments provided herein. At a next step 204, the method associates metadata with a local image. As noted above, image capture devices may include any number of sensors that may provide various data such as, for example, yaw, pitch, and roll at time of capture. Because methods provided herein rely on matching local images having an unknown location against database images having a known location, common sensor information such as global positioning system (GPS) data and barometric data may not be required to estimate pose of an image capture device.

At a next step 206, the method matches a local image with a database image. In this step, conventional methods well-known in the art may be utilized without limitation. In embodiments, each database image has at least one pixel for which 3D depth is known. At a next step 208, the method calculates a pose of the image capture device. At this step, methods begin by using pitch and roll estimates from the image capture device to recover plane normals and yaw via vanishing points. These parameters are then used to solve for a constrained homography matrix for the detected planes to recover translation via matching point feature correspondences between the local image and database images. Methods for calculating a location of the image capture device will be discussed in further detail below for FIG. 3. At a next step 210, the methods returns the image capture device pose whereupon the method ends. Pose may be returned in any manner or fashion well-known in the art without departing from embodiments provided herein.

Figure 3:
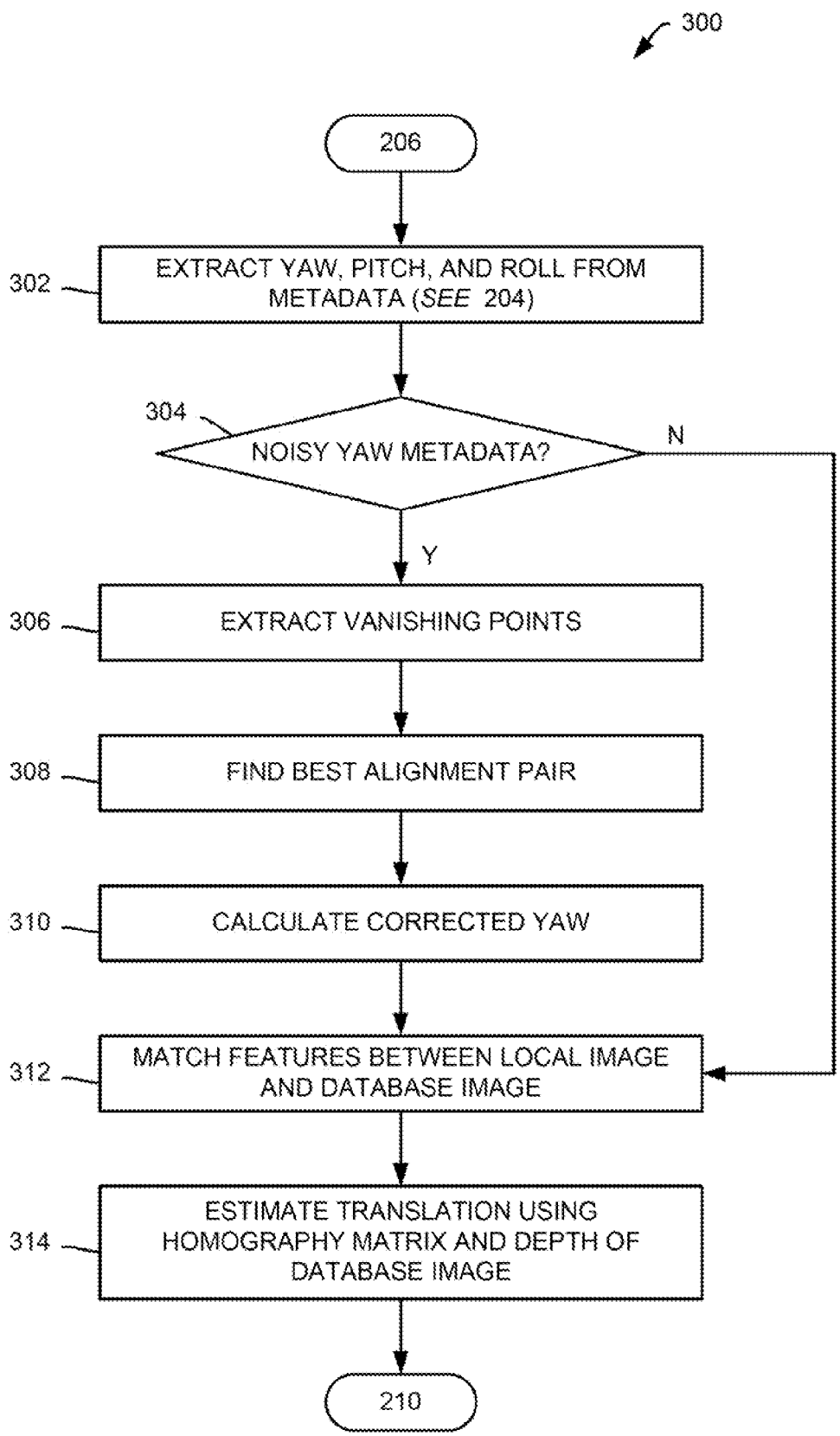
FIG. 3 is an illustrative flowchart of a method for calculating an image capture device location in accordance with embodiments of the present invention.

FIG. 3 is an illustrative flowchart 300 of a method for calculating an image capture device location in accordance with embodiments of the present invention. In particular, illustrative flowchart 300 represents a step 208 as illustrated in FIG. 2. At a first step 302, the method extracts yaw, pitch, and roll from metadata as provided in a step 204. At next step 304, the method determines whether yaw metadata is noisy. If the method determines at a step 304 that yaw metadata is not noisy, the method continues to a step 312. If the method determines at a step 304 that yaw metadata is noisy, the method continues to a step 306. Since urban indoor environments are dominated by planar faces, it may be assumed that many point features lie in a plane. As such a capture device pose may be computed by solving for a homography transformation from the database image D to the local image Q. However, the simultaneous solution of position, orientation, and plane normal is ill-conditioned in a noisy environment with respect to the minimization of reprojection error associated with a homography matrix. To address this issue, methods solve for as few of these parameters as possible in a given homography estimation.

To obtain the orientation of Q (local image), the image capture device accelerometer and magnetometer may be utilized to extract yaw, pitch, and roll. This extraction is reasonably trivial and relies on the direction of gravity from the accelerometer to solve for pitch, roll, and the direction of north from the magnetometer to solve for yaw. To ensure accuracy in these measurements, the accelerometer requires the image capture device to be steady during image capture, and the compass requires an environment free from magnetic interference. The first condition can be satisfied by holding the camera steady, which is also required for capturing crisp images. The second condition is nearly impossible to ensure in urban and indoor environments, as sources of magnetic interference are all around, from power lines to trains. Therefore, methods anticipate the reported yaw by the image capture device, $yaw_{cell}$, to be error prone.

In order to recover a more accurate yaw value for the image capture device and also to compute plane normals for our scene, methods turn to vanishing points. Under the assumption that our scenes have planar faces, methods may obtain plane normals of these planar faces in by computing horizontal vanishing points for both Q and D. This provides a set of planes in each image which we may then be aligned to compute a more accurate yaw value for the image capture device.

As such, at a next step 306, the method extracts vanishing points. Lines may be extracted using the algorithm proposed by Grompone, R., Jakubowicz, J., Morel, J., Randall, G. 2010. LSD: A Fast Line Segment Detector with a False Detection Control. *Pattern Analysis and Machine Intelligence,* 32, 4 (April 2010), 722-732, which is incorporated herein by reference in its entirety. Since methods require only horizontal vanishing points and images are assumed to be near upright, methods may remove lines within 10 degrees of vertical on the image plane. After multiplying by the inverse camera matrix, a set of lines $L=\{L_i\}$ with associated lengths, length $(L_i)$, in the image plane may be obtained.

In order to organize the detected lines into vanishing points, methods create "seeds" representing potential vanishing points to which vanishing lines are assigned. The seeds sample the complete set of all vanishing points perpendicular to gravity, are spaced approximately three degrees apart, and are computed using yaw, pitch, and roll for the image. That is, the method may create a set of approximately sixty potential vanishing point seeds $\{\hat{s}_k\}$ which have no vertical component when represented in the world frame, with yaws ranging from approximately 0 degrees to 177 degrees, and use the image orientation to transform these seeds to the image frame.

From this dense set of seeds, a subset may be found which lies near many of the lines detected in the image, indicating the possibility that the seed is a vanishing point. To find the subset, methods find the maxima of the function $g(\hat{s}_k)$ constructed by assigning image lines to their nearest seeds. Specifically, $$g(\hat{s}_k) = \frac{\sum_{i \in \mathcal{L}_k} \text{length}(L_i)}{\sum_{j \in \mathcal{L}} \text{length}(L_j)} \quad \text{(Equation 2)}$$

where $L_k$ is the set of indices i corresponding to every line $L_i$ which is assigned to vanishing point $\hat{s}_k$. The assignment process is as follows. For example, for every line $L_i$, the seed angle error $\theta_{ik}$ for each $\hat{s}_k$ may be computed. The seed angle error is defined as the angle in the image plane between the lines $L_i$ and $M_{ik}$, where $M_{ik}$ is the line connecting the midpoint of $L_i$ to $s_k$. An index i is then added to the three sets $L_k$ corresponding to the three values of k minimizing $\theta_{ik}$. Assigning weights to three seeds rather than one, smoothes the function $g(\hat{s}_k)$ and accounts for the fact that the true vanishing points may not be perpendicular to gravity.

A subset of the seeds $\{\hat{s}_k\}$ may be selected satisfying the following two conditions:

$$g(\hat{s}_j) \geq g(\hat{s}_k) j-3 \leq k \leq j+3 \quad \text{(Equation 3)}$$

$$g(\hat{s}_j) \geq 1.5 * g_{unif} \text{ where } g_{unif} = 3/60 \quad \text{(Equation 4)}$$

as a set of vanishing points $\{\hat{v}\}$. $g_{unif}$ represents the weight assigned to each seed if all seeds were to receive equal weight. The first condition is a local maximum condition which requires the vanishing point to have a larger weight than all those neighboring seeds within 10 degrees. The second condition requires the weight of the vanishing point to be large enough so that it cannot be an accidental local maximum in a region of sparse contributions. In practice, not all vanishing points are perfectly perpendicular to gravity. In fact, in a most extreme case of the steepest street in the world, the angle between gravity and the hill's vanishing point is only 70 degrees. In existing image datasets however, the angle between gravity and vanishing points is always greater than 85 degrees; therefore, that small difference may be accounted for by applying a guided matching algorithm to the previously computed set of vanishing points obtained from seeds found by maximizing Equation 2. This steers each vanishing point toward a nearby location, not necessarily perpendicular to gravity, which simultaneously maximizes the number of contributing vanishing lines and minimizes the vanishing point deviation from all contributing vanishing lines.

The output of guided matching yields a refined set of vanishing points in the world frame and a set of contributing lines $L_k$. In practice, between one and four horizontal vanishing points per image may be outputted. For the kth vanishing point $\hat{v}_k$, a confidence value based on the total length of all contributing lines may be computed. This is defined as $$c_k = \frac{\sum_{i \in L_k} \text{length}(L_i)}{\sum_{j \in L} \text{length}(L_j)} \quad \text{(Equation 5)}$$

where L is the set of all lines detected in the image.

The methods continues to a step 308 to find best alignment pair and 310 to calculated corrected yaw. As such, vanishing points computed for Q and D may be utilized to extract planes for the scene and to recover yaw orientation for Q. To retrieve planes from the vanishing points, it may be appreciated that the vanishing points represent the directions of a scene's planar faces. Using the assumption that all faces are upright, plane normals may be computed from the vanishing points by taking a cross product of each vanishing point with a gravity vector. Since the sign of the resulting plane normal cannot be determined by the vanishing point, scene geometry may be used to ensure the dot product between the plane normal and the image capture device vector is negative, thus specifying the sign of the plane normal. With the determined sign and the upright plane constraint, methods reduce each plane normal to an associated plane yaw between approximately 0 and 360 degrees, indicating the direction each plane faces.

Thus far, vanishing points, plane yaws, and their associated confidences as computed in Equation 5 for Q and D have been estimated. Methods then compute plane yaws for D using vanishing points regardless of whether or not access to database planes is provided. There are at least three reasons for this: first, it is desirable for methods to be applicable to situations where database planes are not available; second, the confidence parameter is computed as a part of vanishing points and is otherwise not available from the database; and third, since in the later steps methods align planes between Q and D, it is advantageous to have computed both sets of planes using the same approach. Vanishing points for Q and D as $\hat{v}^Q$ and $\hat{v}^D$ are labeled respectively, where the superscripts here denote that the vanishing point source is from D and Q, not that they are represented in the local image and database image coordinate frames. Similarly the plane yaws are labeled $\phi^Q$ and $\phi^D$, while the confidences are labeled $c^Q$ and $c^D$.

Note that the plane yaws and vanishing points for D are considerably more accurate than those for Q since the latter are based on the yaw reported by the image capture device. It is relatively trivial to show that, for a known pitch and roll, and a yaw error of $\Delta\text{yaw}=\text{yaw}_{actual}-\text{yaw}_{cell}$, the transformations to be applied to the query vanishing points and plane yaws to correct for this error are given by:

$$\bar{v}^Q = R(\Delta\text{yaw})\hat{v}^Q \quad \text{(Equation 6)}$$

$$\bar{\phi}^Q = \phi^Q + \Delta\text{yaw} \quad \text{(Equation 7)}$$

where $R(\Delta\text{yaw})$ is the rotation matrix associated with a pitch and roll of zero and a yaw of $\Delta\text{yaw}$. The bars mark a corrected vanishing point or plane yaw after applying an error $\Delta\text{yaw}$.

One objective is to find an optimal alignment of the vanishing points from Q and D in the world frame in order to estimate the yaw error from the image capture device. To proceed, methods exhaustively go through every alignment pair (i,j) corresponding to aligning the ith plane yaw from Q, $\phi_i^Q$, and the jth plane yaw from D, $\phi_j^D$. This is equivalent to making the assertion $\bar{\phi}_i^Q = \phi_j^D$, which in turn represents an image capture device yaw error $\Delta\text{yaw}_{ij} = \phi_j^D - \phi_i^Q$. The reported yaw from the compass (i.e. magnetometer) guides this search by discarding all pairs (i,j) with resulting compass error $|\Delta\text{yaw}|_{ij} > 50$ degrees, in order to avoid aligning the wrong planes.

Thus, for each candidate $\Delta\text{yaw}_{ij}$ within the above range, methods compute an alignment confidence representing how strong the alignment is. To do this for a given (i,j), methods correct the query vanishing points by applying the rotation $R(\Delta\text{yaw}_{ij})$ as in Equation 6 and search for a larger set of aligned pairs, defined as $$A_{ij}\{(m,k)| \angle [R(\Delta\text{yaw}_{ij})\hat{v}_m^Q, \hat{v}_k^D] < 5°\} \quad \text{(Equation 8)}$$

This alignment set contains every pair of vanishing points in Q and D which is aligned when correcting query vanishing points by a yaw error of $\Delta\text{yaw}_{ij}$. With the alignment set for each pair (i,j), we compute a confidence for the alignment, $\text{conf}_{ij}$, which resembles a dot product over every alignment, using the confidence of the aligned vanishing points:

$$\text{conf}_{ij} = \Sigma_{(m,k) \in A_{ij}} c_m^Q c_k^D \quad \text{(Equation 9)}$$

The best alignment pair (i,j) is declared to be the pair which maximizes this confidence parameter $\text{conf}_{ij}$. With this alignment pair, methods refine the estimate of image capture device yaw error, using its alignment set $A_{ij}$, as a weighted average of each aligned plane yaw. That is, $$\Delta\text{yaw} = \frac{\sum_{(m,k) \in A_{ij}} c_m^Q c_k^D \Delta\text{yaw}_{mk}}{\sum_{(m,k) \in A_{ij}} c_m^Q c_k^D} \quad \text{(Equation 10)}$$

where, as before, $\Delta\text{yaw}_{mk} = \phi_k^D - \phi_m^Q$. From this yaw error, methods estimate the yaw for the image capture device as $\text{yaw} = \text{yaw}_{cell} + \Delta\text{yaw}$. Similarly, methods estimate the yaws for our scene's planar normals as $\phi_m = \phi_m^Q + \Delta\text{yaw} \forall m \in A_{ij}$, generating one plane for every alignment in the optimal set. In practice, methods may output one or multiple planes and their normals after the alignment process.

At a next step 312, the method matches features between local image and a database image. In order to estimate a homography matrix (step 314), methods require point correspondences between Q and D. To do so, methods extract high resolution scale invariant feature transform (SIFT) features from the local image and matched database image and perform a nearest neighbor search between the two sets of features to find matches. Methods apply a series of pre-homography filters to reduce the number of correspondences, and in particular reduce the number of incorrect feature matches, i.e. outliers. In some embodiments, any other features known in the art may be utilized without limitation.

Since we expect both Q and D to be upright, i.e. roll around 0, we can filter out feature correspondences by their gradient orientation, a parameter we have access to from the SIFT decomposition. The first filter we apply requires feature correspondence to have orientations within 60 degrees of each other. Note that this threshold is deliberately chosen to be fairly large, as the SIFT orientations are computed on the two dimensional image plane, and therefore a difference in three dimensional viewing angle, e.g. yaw, between Q and D can lead to a large difference in the SIFT feature orientation. Methods apply a relative distance filter, or ratio test, to keep only feature correspondences that are unique.

Methods utilize the 3D database extensively in the homography computation, and as such, database parameters also play a part in filtering out correspondences pre-homography. The first such filter removes all database image SIFT feature correspondences that lack depth data. This is because all such features are either too near to the database camera or are part of the sky in an outdoor case, neither of which is desirable to keep. In practice this removes very few features. The next filter only applies to databases which contain 3D plane information. When plane data is present, we are able to isolate and remove the ground plane SIFT features present in D. In practice, methods have found that feature correspondences that include the database features on the ground rarely help and primarily hinder the homography solution, and therefore all such features may be removed in embodiments.

For feature detection, in some embodiments, methods may use a feature such as speeded up robust features (SURF) rather than SIFT. In addition, in other embodiments, any other feature sets without limitation. Methods may also match these features more intelligently than with a linear nearest neighbor search, which guarantees the closest match, but does not scale well with number of features.

At a next step 314, the method estimates translation using homography matrix and depth of database image, which is described in further detail below for FIG. 4. Given yaw, plane normals, and feature matches, methods now estimate a homography matrix to solve for translation. To do so, methods must take into account known parameters, utilize 3D information to recover the scale of translation, and account for outliers with robust estimation. Notably, all vectors are assumed to be represented in the coordinate frame for Q, except when the vector has a superscript d, which denotes that the vector is in the coordinate frame for D.

Figure 4:
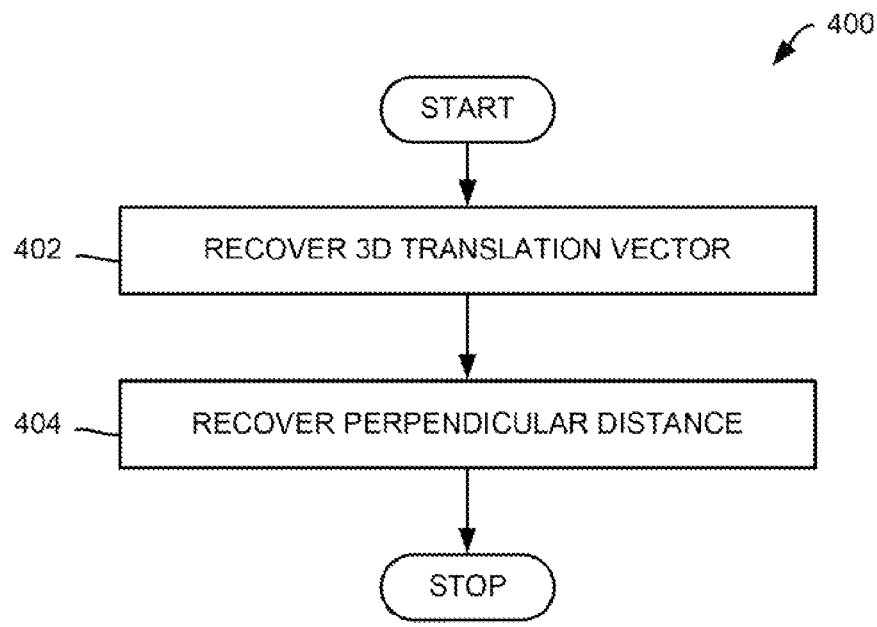
FIG. 4 is an illustrative flowchart of methods for estimating translation of a image capture device in accordance with embodiments of the present invention.

FIG. 4 is an illustrative flowchart 400 of methods for estimating translation of a image capture device in accordance with embodiments of the present invention. In particular, illustrative flowchart further illustrates a step 314 as described above for FIG. 3. At a step 402, the methods recovers 3D translation vector. It is noted that methods provide for homography estimation using the constraints imposed by the known planes and orientations. The homography transformation maps a plane from a starting view D, which in the disclosed set up has a known pose, to a new view, Q, containing the same plane. The homography transformation is defined as the mapping from any point feature $\hat{x}^d$ on D to its corresponding feature $\hat{y}$ on Q using the following relation:

$$\hat{y} \propto H\hat{x}^d \text{ where } H = R_d^q + r\hat{t}(\hat{n}^d)^T \quad \text{(Equation 11)}$$

The symbol $\propto$ represents proportionality and the superscript T denotes a vector transpose. H is the canonical homography matrix, representing a rotation and translation of $\hat{x}^d$ to map to the feature location $\hat{y}$. $R_d^q$ and $\bar{t}$ are the rotation and translation parameters that map a 3D point from D to Q. i.e. $\bar{y} = R_d^q \bar{x}^d + \bar{t}$, where $\bar{t}^d$ and $\bar{y}$ represent the true 3D locations, including depth, of the feature points $\hat{x}^d$ and $\hat{y}$ respectively. In this way, $\hat{t}$ is the direction of translation. The parameter $\hat{n}^d$ is the normal vector of the scene plane, while r is a unitless scale factor defined as the ratio $r=|\bar{t}|/p$, where p is the projected distance from the plane to the center of the image capture device for D, i.e. $p=(\hat{n}^d)^T\bar{x}^d$ for all points $\bar{x}^d$ on the plane. Note that the homography matrix traditionally requires solving for eight parameters.

Since methods know the absolute orientation of D, and have computed the same for Q using vanishing points, methods know $R_d^q$. Therefore methods can remove orientation from Equation 4 by mapping $\hat{x}^d$, $\bar{x}^d$, and $\hat{n}^d$ to the query coordinate frame, i.e. $\hat{x}=R_d^q\hat{x}^d$, $\bar{x}=R_d^q\bar{x}^d$, and $\hat{n}=R_d^q\hat{n}^d$. In doing so, methods obtain the simplified homography relation with all variables in the query coordinate frame:

$$\hat{y} \propto J\hat{x} \text{ where } J = 1 + r\hat{t}\hat{n}^T \quad \text{(Equation 12)}$$

Methods now have a simple expression containing a transformed homography matrix with only five unknown parameters: two in each of $\hat{t}$ and $\hat{n}$ and one in r. Using the assumption that all planar faces are upright, methods eliminate one parameter from the plane normal leaving a scalar plane yaw as the only parameter in $\hat{n}$. This reduces the number of unknown parameters to four in Equation 12. It is possible to further reduce the number of unknown parameters to three by using known plane yaws from vanishing points as described above. Then, in practice, the total number of unknown parameters for this constrained homography could be 3 or 4 depending on the reliability of plane yaw estimates from other sources.

In order to find an optimal solution minimizing error, methods define an error metric for Equation 12. It may be noted that Equation 12 contains three proportionality constraints using the same proportionality factor, and so methods can divide by one of them to obtain two equality constraints. The two equality constraints can be formulated as a reprojection error metric for a given feature correspondence pair $(\hat{x}, \hat{y})$ and parameter solution set $(r, \hat{t}, \hat{n})$ $$e[0] = \hat{y}[0]/\hat{y}[2] - \bar{z}[0]/\bar{z}[2] \quad \text{(Equation 13)}$$

$$e[1] = \hat{y}[1]/\hat{y}[2] - \bar{z}[1]/\bar{z}[2] \quad \text{(Equation 14)}$$

$$\text{with } \bar{z} \triangleq \hat{x} + r\hat{t}\hat{n}^T\hat{x} \quad \text{(Equation 15)}$$

The first terms $\hat{y}[0]/\hat{y}[2]$ and $\hat{y}[1]/\hat{y}[2]$ of Equations 13 and 14 respectively represent the left side of Equation 12, while the second terms $\bar{z}[0]/\bar{z}[2]$ and $\bar{z}[1]/\bar{z}[2]$ represent the right side. Equations 13-15 are the canonical homography reprojection error under the constraints methods have imposed. When the errors are small, the division methods have justified for $\hat{y}$ is also justified for $\bar{z}$. Since the error constraint is two-dimensional and methods solve for at most four parameters, methods can find a unique solution which minimizes error using only two independent correspondence pairs, rather than the four that would have been required had methods not constrained the problem as above. This reduced complexity better conditions the homography estimation and improves runtime dramatically for our robust estimation algorithm, which is outlined below.

At a next step 404, the method recovers perpendicular distance or scale recovery. It is noted that methods solve for the scale of translation. In the error metrics described above, methods found that solving for the homography parameters does not provide the absolute distance $|\bar{t}|$ between the query and database views, but only the direction $\hat{t}$. To recover the distance, note that the homography solution obtained does solve for $r=|\bar{t}|/p$. Using a database feature's depth $|\bar{x}|$, methods can compute p with only one database feature as $$p = \hat{n}^T\bar{x} = |\bar{x}||\hat{n}^T\hat{x}| \quad \text{(Equation 16)}$$

where $\hat{n}$ and $\hat{x}$ above are in the same coordinate system. Once methods have the distance p from the center of the image capture device for D to the plane, methods also have the translation scale as $|\vec{t}|=rp$, resulting in the absolute position of Q.

Methods incorporate Equation 16 into the error metric of Equations 13-15 to find an optimal solution by defining an expanded three-dimensional error metric for a given feature pair and depth $(\hat{x},\hat{y},|\vec{x}|)$ and expanded solution set $(r, p, \hat{t}, \hat{n})$ $$e[0]=\hat{y}[0]/\hat{y}[2]-\vec{Z}[0]/\vec{Z}[2] \quad \text{(Equation 17)}$$

$$e[1]=\hat{y}[1]/\hat{y}[2]-\vec{Z}[1]/\vec{Z}[2] \quad \text{(Equation 18)}$$

$$e[2]=\alpha(1-|\vec{x}|\hat{n}^T\hat{x}/p) \quad \text{(Equation 19)}$$

Methods have deliberately chosen the error metric e[2] in Equation 19 not to be $p-|\vec{x}|\hat{n}^T\hat{x}$, because this would result in an error metric with units of meters. Rather, methods choose the form in Equation 19 to match the unitless reprojection errors e[0] and e[1]. The constant α in e[2] is a factor which determines the relative importance of the plane depth error with respect to lateral reprojection error. Since 3D databases utilized in embodiments tend to have greater depth error than lateral error, in some embodiments, methods set α=0.2, which equates 5% depth error to 1% lateral deviation error. The addition of scale to the error metric has introduced one more unknown parameter, namely p, and one more constraint, namely Equation 16. With this change, methods still require two correspondence pairs to find a unique solution minimizing the error function e.

Robust Estimation

Methods estimate the homography parameters using Random Sample Consensus (RANSAC). Since methods have constrained homography estimation problem embodiments, methods only need two random correspondences in each iteration to find an initial solution set to test. The number of samples I which is required to compute a hypothesis solution is one of three parameters dictating the approximate number of iterations that a RANSAC loop requires. The other two parameters are ω, the approximate fraction of all samples that are inliers to the solution, and ρ, the probability that methods attain a solution. The number of iterations is given by:

$$iter(\rho, \omega, l) \cong \frac{\log(1-p)}{\log(1-\omega^l)} \quad \text{(Equation 20)}$$

Based on the dependence of the function iter on l, the required number of iterations is considerably lower for l=2 than for l=4. However, this is offset by a decrease in ω, since methods add an additional depth constraint to the error metric in Equation 19, possibly rejecting feature correspondences which could have been inliers in a standard homography. In practice, the percentage of inliers for systems disclosed herein is between 2% and 20%, and as such, methods generally run between 1000 and 100,000 iterations, with the higher number of iterations occurring when a resulting solution appears to be physically infeasible.

For the RANSAC loop, methods compute a weight w for each feature correspondence in order to find the "best" inlier set of features. This weight places a larger emphasis on database features which in 3D are spatially closer to the center of the camera for D. Methods place this weight on each feature for two reasons: first, the error metric of Equation 13-15 tends to have lower reprojection errors for features in a plane far away from the center of the camera; second, closer features tend to be more accurate and therefore produce more accurate pose estimates. For these two reasons, methods also target the system for a user taking images across the street rather than down the street or at a further distance. The weight methods apply to each feature correspondence is based on the database feature depth and is defined as $$w(|\vec{x}|) = \begin{cases} 20/|\vec{x}|, & |\vec{x}| \geq 20 \text{ meters} \\ 1, & |\vec{x}| < 20 \text{ meters} \end{cases} \quad \text{(Equation 21)}$$

For each potential RANSAC solution, methods apply three filters which weed out poor solutions and allow us to detect when RANSAC has failed. These three validity checks are:

$$|M| \geq f_{inlier} \quad \text{(Equation 22)}$$

$$|\vec{t}| < 75 \text{ meters} \quad \text{(Equation 23)}$$

$$|2+\Delta vert| < 3 \text{ meters} \quad \text{(Equation 24)}$$

where M is the inlier subset of all features correspondences and Δvert is the computed vertical displacement between the center of the cameras from D to Q. Equation 22 implies the number of inliers must be greater than or equal to a fixed parameter $f_{inlier}$ chosen ahead of time; Equation 23 implies the distance between Q and D must be less than 75 meters (although other distance may be utilized in other embodiments): Equation 24 implies vertical displacement in the world frame must lie in a bounded region. The third validity check in Equation 24 uses an assumption about the constraints of our problem. In practice methods have found that query images taken by a human user are consistently around 2 meters below their respective database images taken by a van or any other vehicle or device that is used to collect outdoor images for use with a database. Methods therefore add this check to reject solutions that do not fit in a bounded region around that vertical displacement. In other embodiments, other bounds may be utilized without limitation. When all solutions fail these validity checks, the homography estimation has failed and methods output a null solution. This case allows for fail-safe runs and conditions set forth below.

For each valid solution, methods compute the confidence of its corresponding inlier set M, defined as the ratio of the sum of the inlier weights to the sum of all correspondence weights:

$$conf(M) = \frac{\sum_{m \in M} w_m}{\sum_k w_k} \quad \text{(Equation 25)}$$

Over all iterations, the valid solution set with the largest inlier confidence is chosen as the optimal solution. Following the RANSAC loop, methods apply guided matching to the optimal solution set. Methods also use Equation 25 to choose among multiple plane candidates in a given scene. Unlike the case where the plane yaw for $\hat{n}$ is computed from vanishing points, whenever plane yaw is derived from database planes, the spatial extent of the plane is also known. This helps to filter out features that do not lie on the plane resulting in a smaller input correspondence set to the homography algorithm.

Setup and Fail-Safe Conditions

The validity checks outlined above allow for failure cases, where no solutions are found. Methods opt to take advantage of this by being stringent on our definition of a valid solution, then relaxing the validity checks and inputs for queries that need it. As such, methods run up to three execution cases, one primary and two fail-safe. Three parameters are varied over these cases: the error threshold E for defining an inlier, the minimum number of feature inliers $f_{inlier}$, and the approach taken with the plane normal $\hat{n}$.

In the first execution case, methods set $\epsilon=0.01$ and $f_{inlier}=15$. In addition, methods fix the plane normal $\hat{n}$ as known, drawing from a set of planar candidates from both vanishing points and database planes. If the result of this execution case returns no valid solution, then the parameters $\epsilon$ and $f_{inlier}$ are relaxed. The second execution case handles $\hat{n}$ identically to the first, but sets $\epsilon=0.03$ and $f=10$.

If there is no solution after the second case, methods relax the restriction on $\hat{n}$ for a final execution. The other parameters remain the same, i.e. $\epsilon=0.03$ and $f=10$, but rather than drawing from a set of planar candidates, methods solve for the plane yaw of $\hat{n}$ within the homography estimation disclosed above.

If the final execution case fails to retrieve a valid solution, then methods naively set the 3D translation vector $\vec{t}=0$, implying that Q and D are taken from the same spot. This mirrors the approach taken when homography solutions fail. In practice, most queries find a valid solution in the first execution case, while only a few fail in all execution cases.

While this invention has been described in terms of several embodiments, there are alterations, permutations, and equivalents, which fall within the scope of this invention. It should also be noted that there are many alternative ways of implementing the methods, computer program products, and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for image based localization using an electronic computing device, the method comprising:
    capturing a local image with an image capture device;
    associating metadata with the local image;
    causing the electronic computing device to receive the local image;
    causing the electronic computing device to match the local image with at least one database image, wherein the at least one database image is three-dimensional (3D); and
    calculating a pose of the image capture device based on a pose of the at least one database image and metadata associated with the local image, wherein
        the metadata includes at least pitch and roll data corresponding with the image capture device at a time of image capture, wherein
        the calculating the pose comprises:
            extracting the pitch and roll data from the metadata;
            extracting yaw data from the metadata;
            matching features between the local image and the database image; and
            estimating a homography matrix to solve for translation of the image capture device with respect to the database image, and wherein
        the matching features comprises:
            extracting high resolution scale invariant feature transform (SIFT) features from the local image and the database image;
            performing a nearest neighbor search to establish any correspondence between the extracted SIFT features of the local image and the database image;
            excluding any corresponding database image SIFT features that lack depth data; and
            excluding ground plane SIFT features of the database image.

2. The method of claim 1 further comprising:
    if the yaw data from metadata of the local image captured is noisy,
        extracting a first plurality of vanishing points corresponding with the local image;
        extracting a second plurality of vanishing points corresponding with the database image;
        finding a best alignment pair between the vanishing points;
        calculating a corrected yaw of the image capture device; and
        calculating a normal direction of a vertical plane associated with each vanishing point in the local image that was matched to the vanishing point in the database image.

3. The method of claim 2, wherein estimating the homography matrix comprises:
    recovering a 3D translation vector, wherein the 3D translation vector includes direction and magnitude, between the local image and the matched database image; and
    recovering a perpendicular distance between a center of the image capture device and the vertical plane in the local image for which the first plurality of vanishing points is extracted.

4. The method of claim 1, wherein the image capture device is selected from the group consisting of: a mobile communication device, a digital camera, and a digital camcorder.

5. The method of claim 1, wherein the image capture device includes a sensor selected from the group consisting of: a gyroscope, an accelerometer, a compass, and a magnetometer.

6. A method for image based localization using an electronic computing device, the method comprising:
    causing the electronic computing device to receive a local image captured from an image capture device;
    causing the electronic computing device to receive metadata associated with the local image;
    causing the electronic computing device to match the local image with at least one database image, wherein the at least one database image is 3D; and
    calculating a pose of the image capture device based on a pose of the at least one database image and metadata associated with the local image, wherein
        the metadata includes at least pitch and roll data corresponding with the image capture device at a time of image capture, wherein
        the calculating the pose comprises:
            extracting the pitch and roll data from the metadata;
            extracting yaw data from the metadata;
            matching features between the local image and the database image; and
            estimating a homography matrix to solve for translation of the image capture device with respect to the database image, and wherein
        the matching features comprises:
            extracting high resolution scale invariant feature transform (SIFT) features from the local image and the database image;
            performing a nearest neighbor search to establish any correspondence between the extracted SIFT features of the local image and the database image;
            excluding any corresponding database image SIFT features that lack depth data; and excluding ground plane SIFT features of the database image.

7. The method of claim 6 further comprising:
if the yaw data from the metadata of the local image captured is noisy,
  extracting a first plurality of vanishing points corresponding with the local image;
  extracting a second plurality of vanishing points corresponding with the database image;
  finding a best alignment pair between the vanishing points;
  calculating a corrected yaw of the image capture device; and
  calculating a normal direction of a vertical plane associated with each vanishing point in the local image that was matched to the vanishing point in the database image.

8. The method of claim 7, wherein estimating the homography matrix comprises:
  recovering a 3D translation vector, wherein the 3D translation vector includes direction and magnitude between the local image and the matched database image; and
  recovering a perpendicular distance between a center of the image capture device and the vertical plane in the local image for which the first plurality of vanishing points is extracted.

9. The method of claim 6, wherein the image capture device includes a sensor selected from the group consisting of: a gyroscope, an accelerometer, a compass, and a magnetometer.

10. A computing device program product for image based localization using a computing device, the computing device program product comprising:
  a non-transitory computer readable medium;
  first programmatic instructions for receiving a local image captured from an image capture device;
  second programmatic instructions for receiving metadata associated with the local image;
  third programmatic instructions for matching the local image with at least one database image, wherein the at least one database image is 3D; and
  fourth programmatic instructions for calculating a pose of the image capture device based on a pose of the at least one database image and metadata associated with the local image, wherein
    the metadata includes at least pitch and roll data corresponding with the image capture device at a time of image capture, wherein
  the calculating the pose comprises:
    fifth programmatic instructions for extracting the pitch and roll data from the metadata;
    sixth programmatic instructions for extracting yaw data from the metadata;
    seventh programmatic instructions for matching features between the local image and the database image; and
    eighth programmatic instructions for estimating a homography matrix to solve for translation of the image capture device with respect to the database image, and wherein
  the matching features comprises:
    ninth programmatic instructions for extracting high resolution scale invariant feature transform (SIFT) features from the local image and the database image;
    tenth programmatic instructions for performing a nearest neighbor search to establish any correspondence between the extracted SIFT features of the local image and the database image;
    eleventh programmatic instructions for excluding any corresponding database image SIFT features that lack depth data; and
    twelfth programmatic instructions for excluding ground plane SIFT features of the database image.

11. The computing device program product of claim 10 further comprising:
if the yaw data from the metadata of the local image captured is noisy,
  thirteenth programmatic instructions for extracting a first plurality of vanishing points corresponding with the local image;
  fourteenth programmatic instructions for extracting a second plurality of vanishing points corresponding with the database image;
  fifteenth programmatic instructions for finding a best alignment pair between the vanishing points;
  sixteenth programmatic instructions for calculating a corrected yaw of the image capture device; and
  seventeenth programmatic instructions for calculating a normal direction of a vertical plane associated with each vanishing point in the local image that was matched to the vanishing point in the database image.

* * * * *